US011978466B2

United States Patent

(12) United States Patent
Zhang et al.

(10) Patent No.: US 11,978,466 B2
(45) Date of Patent: May 7, 2024

(54) SYSTEMS, METHODS, AND APPARATUSES FOR RESTORING DEGRADED SPEECH VIA A MODIFIED DIFFUSION MODEL

(71) Applicant: Arizona Board of Regents on behalf of Arizona State University, Scottsdale, AZ (US)

(72) Inventors: Jianwei Zhang, Phoenix, AZ (US); Suren Jayasuriya, Tempe, AZ (US); Visar Berisha, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 131 days.

(21) Appl. No.: 17/827,438

(22) Filed: May 27, 2022

(65) Prior Publication Data

US 2022/0392471 A1 Dec. 8, 2022

Related U.S. Application Data

(60) Provisional application No. 63/196,071, filed on Jun. 2, 2021.

(51) Int. Cl.
*G10L 21/02* (2013.01)
*G10L 19/028* (2013.01)
(Continued)

(52) U.S. Cl.
CPC ............ *G10L 21/02* (2013.01); *G10L 19/028* (2013.01); *G10L 25/18* (2013.01); *G10L 25/30* (2013.01)

(58) Field of Classification Search
CPC ....... G10L 19/028; G10L 25/18; G10L 25/30; G10L 21/02; G10L 21/038
See application file for complete search history.

(56) References Cited

U.S. PATENT DOCUMENTS

| | | | |
|---|---|---|---|
| 10,304,009 | B1 | 5/2019 | Kim et al. |
| 10,360,901 | B2 | 7/2019 | Sainath et al. |

(Continued)

OTHER PUBLICATIONS

Zhang, Jianwei, Suren Jayasuriya, and Visar Berisha. "Restoring degraded speech via a modified diffusion model." arXiv preprint arXiv:2104.11347 (2021). (Year: 2021).*

(Continued)

*Primary Examiner* — Douglas Godbold
(74) *Attorney, Agent, or Firm* — Elliott, Ostrander & Preston, P.C.

(57) ABSTRACT

Systems, methods, and apparatuses to restore degraded speech via a modified diffusion model are described. An exemplary system is specially configured to train a diffusion-based vocoder containing an upsampler, based on pairing original speech x and degraded speech mel-spectrum $m_T$ samples; train a deep convoluted neural network (CNN) upsampler based on a mean absolute error loss to match the estimated original speech $\hat{x}'$ outputted by the diffusion-based vocoder by extracting the upsampler, generating a reference conditioner, and generating a weighted altered conditioner $c_{T_n}'$. The system further optimizes speech quality to invert non-linear transformation and estimate lost data by feeding the degraded mel-spectrum $m_T$ through the CNN upsampler and feeding the degraded mel-spectrum $m_T$ through the diffusion-based vocoder. The system then generates estimated original speech $\hat{x}'$ based on the corresponding degraded speech mel-spectrum $m_T$. Other related embodiments are described.

20 Claims, 8 Drawing Sheets

(51) Int. Cl.
*G10L 25/18* (2013.01)
*G10L 25/30* (2013.01)

(56) References Cited

U.S. PATENT DOCUMENTS

| | | | | |
|---|---|---|---|---|
| 2019/0333521 | A1 | 10/2019 | Khoury et al. | |
| 2020/0243102 | A1 * | 7/2020 | Schmidt | G06N 3/063 |
| 2021/0256988 | A1 * | 8/2021 | Gallart | G10L 25/24 |
| 2022/0223162 | A1 * | 7/2022 | Assael | G06N 3/045 |
| 2023/0016637 | A1 * | 1/2023 | Schmidt | G06N 3/045 |
| 2023/0110255 | A1 * | 4/2023 | Chen | G10L 19/02 704/500 |
| 2023/0162725 | A1 * | 5/2023 | Jin | G06N 3/045 704/232 |
| 2023/0162758 | A1 * | 5/2023 | Borgstrom | G10L 25/24 704/200 |
| 2023/0186937 | A1 * | 6/2023 | Uhlich | G10L 15/08 704/251 |
| 2023/0197043 | A1 * | 6/2023 | Martinez Ramirez | G06N 3/084 381/61 |

OTHER PUBLICATIONS

Kong, Zhifeng, et al. "Diffwave: A versatile diffusion model for audio synthesis." arXiv preprint arXiv:2009.09761 (2020). (Year: 2020).*

3GPP, "3gpp ts 26.090—mandatory speech codec speech processing functions; adaptive multi-rate (amr) speech codec; transcoding functions," 3GPP, Retrieved Jul. 21, 2010.

Abd El-Fattah, M., et al., "Speech enhancement using an adaptive wiener filtering approach," Progress in Electromagnetics Research M, vol. 4, 2008, pp. 167-184.

Ardila, R. et al., "Common voice: A massively-multilingual speech corpus," Proceedings of the 12th Conference on Language Resources and Evaluation, 2020, pp. 4211-4215.

Garofolo, J. S., et al., "DARPA TIMIT acoustic-phonetic continous speech corpus CD-ROM. NIST speech disc 1-1.1," NASA STI/Recon technical report n, vol. 93, p. 27403, 1993.

Hasan, M.K., et al., "A modified a priori SNR for speech enhancement using spectral subtraction rules," IEEE Signal Processing Letters, vol. 11, No. 4, 2004, pp. 450-453.

Hsieh, T.A., et al., "Improving perceptual quality by phone-fortified perceptual loss for speech enhancement," arXiv preprint arXiv:2010.15174, 2020.

Hu, Y. et al., "Evaluation of objective quality measures for speech enhancement," IEEE Transactions on Audio, Speech, and Language Processing, vol. 16, No. 1, 2007, pp. 229-238.

Kingma, D. P. et al., "Adam: A method for stochastic optimization," arXiv preprint arXiv:1412.6980, 2014.

Kong, Z. et al., "Diffwave: A versatile diffusion model for audio synthesis," arXiv preprint arXiv:2009.09761, 2020.

Lan, T. et al., "Combining multi-perspective attention mechanism with convolutional networks for monaural speech enhancement," IEEE Access, vol. 8, 2020, pp. 78979-78991.

Loizou, P.C., "Speech enhancement: theory and practice," CRC Press, 2013.

Pascual, S. et al., "SEGAN: Speech enhancement generative adversarial network," arXiv preprint arXiv: 1703.09452, 2017.

Ping, W. et al., "Waveflow: A compact flow-based model for raw audio," International Conference on Machine Learning, PMLR, 2020, pp. 7706-7716.

Rix, A.W., et al., "Perceptual evaluation of speech quality (PESQ)—a new method for speech quality assessment of telephone networks and codecs," 2001 IEEE International Conference on Acoustics, Speech, and Signal Processing. Proceedings (Cat. No. 01CH37221), vol. 2. IEEE, 2001, pp. 749-752.

Su, J. et al., "HiFi-GAN: High-fidelity denoising and dereverberation based on speech deep features in adversarial networks," arXiv preprint arXiv:2006.05694, 2020.

Subramanian, A.S., et al., "Speech enhancement using end-to-end speech recognition objectives," 2019 IEEE Workshop on Applications of Signal Processing to Audio and Acoustics (WASPAA). IEEE, 2019, pp. 234-238.

Tan, K. et al., "Real-time speech enhancement using an efficient convolutional recurrent network for dual-microphone mobile phones in close-talk scenarios," ICASSP 2019-2019 IEEE International Conference on Acoustics, Speech and Signal Processing (ICASSP). IEEE, 2019, pp. 5751-5755.

Tremain, T. E. "The government standard linear predictive coding algorithm: Lpc-10," Speech Technology Magazine, 1982, pp. 40-49.

v. d. Oord, A. et al., "Wavenet: A generative model for raw audio," arXiv preprint arXiv: 1609.03499, 2016.

* cited by examiner

Table 1 - 175

| | 118 Transformation | 182 Model | 183 PFP Loss | 184 PESQ | 185 CSIG | 186 CBAQ | 187 COVL |
|---|---|---|---|---|---|---|---|
| 176 In-Corpus (TIMIT) | 182 LPC-10 Compression | Degraded 180 | 0.0173(0.0010) | 1.2029(0.1122) | 1.9829(0.3419) | 1.5589(0.1747) | 1.4826(0.2501) |
| | | DW 178 | 0.0140(0.0009) | 1.2401(0.1216) | 2.7146(0.3138) | 1.7311(0.1857) | 1.8833(0.2543) |
| | | ModDW 179 | **0.0121(0.0009)*** | **1.5056(0.2287)*** | **3.1048(0.2865)*** | **1.8705(0.1781)*** | **2.2390(0.2794)*** |
| | 183 AMR-NB Compression | Degraded | 0.0150(0.0006) | 2.2787(0.2937) | 2.8363(0.4383) | 2.3645(0.1581) | 2.5355(0.3529) |
| | | DW | 0.0130(0.0008) | 2.0022(0.2661) | 3.1793(0.2508) | 2.2444(0.1415) | 2.5687(0.2506) |
| | | ModDW | **0.0112(0.0006)*** (189) | **2.4498(0.3421)*** | **3.5618(0.2812)*** | **2.5127(0.1791)*** | **3.0008(0.3070)*** (188) |
| | 184 Signal Clip (25%) | Degraded | 0.0116(0.0006) | 1.5439(0.2155) | 2.3717(0.2622) | 1.8279(0.1699) | 1.7797(0.2211) |
| | | DW | 0.0112(0.0004) | 1.5022(0.1859) | 2.5630(0.2084) | 1.9280(0.1988) | 1.8145(0.2632) |
| | | ModDW | **0.0096(0.0003)*** | **2.2144(0.2845)*** | **2.6871(0.2544)*** | **2.5410(0.1831)*** | **2.2687(0.2988)*** |
| 177 Cross-Corpus (Mozilla) | 182 LPC-10 Compression | Degraded 180 | 0.0156(0.0019) | 1.2134(0.1086) | 2.0628(0.3548) | 1.4790(0.1573) | 1.5254(0.2281) |
| | | DW 178 | 0.0154(0.0021) | 1.2088(0.1173) | 2.5583(0.3408) | 1.5060(0.2046) | 1.7547(0.2453) |
| | | ModDW 179 | **0.0132(0.0022)*** | **1.3499(0.2165)*** | **2.7654(0.3624)*** | **1.6039(0.2365)*** | **1.9536(0.2959)*** |
| | 183 AMR-NB Compression | Degraded | 0.0145(0.0015) | 1.7621(0.2779) | 2.5079(0.4845) | 2.0105(0.1617) | 2.0700(0.3487) |
| | | DW | 0.0144(0.0013) | 1.6875(0.2447) | 2.5943(0.4694) | 1.8846(0.1780) | 2.0557(0.3276) |
| | | ModDW | **0.0129(0.0011)*** | **1.8793(0.3267)*** | **2.8109(0.4629)*** | **2.0763(0.1921)*** | **2.2853(0.3698)*** |
| | 184 Signal Clip (25%) | Degraded | 0.0120(0.0007) | 1.3540(0.1569) | 2.9644(0.3566) | 1.5659(0.0994) | 2.1180(0.2467) |
| | | DW | 0.0122(0.0008) | 1.2156(0.1355) | 3.0144(0.3266) | 1.6804(0.1698) | 2.0098(0.2554) |
| | | ModDW | **0.0115(0.0005)*** | **2.0756(0.4285)*** | **3.4742(0.4177)*** | **2.2240(0.2213)*** | **2.7385(0.4074)*** |

FIG. 3

801
802
PROCESSOR
PROCESSING LOGIC
826
836
PERIPHERAL DEVICE
808
MAIN MEMORY
REFERENCE UP-SAMPLER
828
DEEP CNN UP-SAMPLER
823
RESTORED SPEECH $\hat{x}'$
825
812
ALPHANUMERIC INPUT DEVICE
CURSOR CONTROL DEVICE
813
810
USER INTERFACE
BUS
830
816
INTEGRATED SPEAKER
808
NETWORK INTERFACE CARD (NIC)
818
SECONDARY MEMORY
MACHINE-ACCESSIBLE STORAGE MEDIUM
831
SOFTWARE
822
820
Network

SYSTEMS, METHODS, AND APPARATUSES FOR RESTORING DEGRADED SPEECH VIA A MODIFIED DIFFUSION MODEL

CLAIM OF PRIORITY

This application is related to, and claims priority to, U.S. Provisional Patent Application No. 63/196,071, entitled "RESTORING DEGRADED SPEECH VIA A MODIFIED DIFFUSION MODEL," filed on Jun. 2, 2021, the entire contents of which are incorporated herein by reference as though set forth in full.

GOVERNMENT RIGHTS AND GOVERNMENT AGENCY SUPPORT NOTICE

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of vocoders and machine learning via neural network architecture, and more particularly, to systems, methods, and apparatuses for restoring degraded speech via a modified diffusion model.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Many algorithms and mathematical operations degrade the quality of speech. For example, speech compression algorithms reduce the sampling rate and use linear predictive coding to compress the input; clipping of speech introduces high frequency content with a negative impact on quality. Reduced speech quality can impact intelligibility and makes the resulting speech less suitable for downstream applications like automatic speech recognition or speaker identification algorithms.

Problematically, prior solutions for restoring degraded speech via speech enhancement (SE) methods such as speech de-noising, de-reverberation and equalization remove background noise, often through an additive noise model using compression and clipping. Such methods are non-linear and result in a "lossy" compression and decompression cycle rather than a "lossless" compression and decompression cycle. Where lossless techniques are not appropriate or suitable, it is desirable to minimize losses and other undesirable artifacts attributable to compression algorithms. Where compression techniques have degraded an original source, it may be necessary to implement restoration processes.

Embodiments described herein provide machine learning based speech enhancement techniques capable of inverting lossy transformation and restore missing information through the combination of a diffusion-based model with an inversion network architecture.

The present state of the art may therefore benefit from the systems, methods, and apparatuses for restoring degraded speech via a modified diffusion model, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 3 depicts Table 1 which shows quantitative measures of speech quality for in-corpus and cross-corpus evaluations, in accordance with described embodiments;

DETAILED DESCRIPTION

Figure 1:
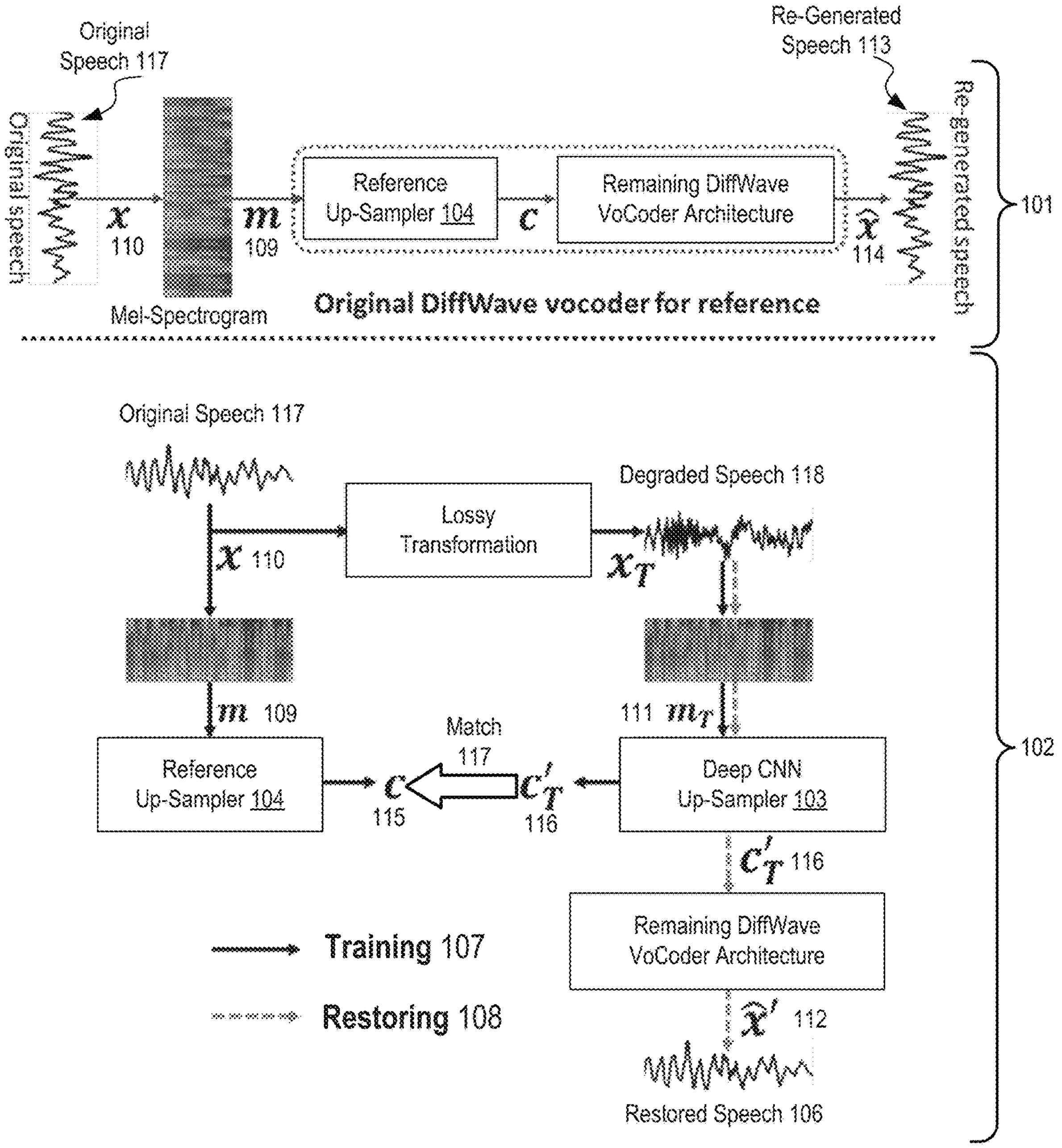
FIG. 1 depicts a training method for the original DiffWave model contrasted with a novel training method adding a deep CNN upsampler, in accordance with described embodiments.

Described herein are systems, methods, and apparatuses for restoring degraded speech via a modified diffusion model. For instance, an exemplary system is specially configured for restoring speech waveform generation. Such an exemplary system may train a diffusion-based vocoder containing an upsampler, based on pairing original speech x and degraded speech mel-spectrum $m_T$ samples. The exemplary system further independently trains a deep convoluted neural network (CNN) upsampler based on a mean absolute error loss to match the estimated original speech $\hat{x}'$ outputted by the diffusion-based vocoder via the operations of: extracting the upsampler from the diffusion-based vocoder to serve as a reference upsampler for training the CNN upsampler, generating a reference conditioner c from original speech mel-spectrum m via the reference upsampler, and by further generating a weighted altered conditioner $c_{T_n}'$ based on the corresponding degraded speech mel-spectrum $m_T$ via the CNN upsampler. The exemplary system further optimizes speech quality to invert non-linear transformation and estimate lost data via the operations of: feeding the degraded mel-spectrum $m_T$ through the CNN upsampler, generating an altered conditioner $c_T'$, and feeding the degraded mel-spectrum $m_T$ through the diffusion-based vocoder; and generating estimated original speech $\hat{x}'$ based on the corresponding degraded speech mel-spectrum $m_T$.

A vocoder (the term being a contraction of VOice and enCODER) is a category of speech coding that analyzes and synthesizes the human voice signal for audio data compression, multiplexing, voice encryption or voice transformation. A vocoder generally provides a means of synthesizing human speech and channel vocoder provides a mechanism for speech coding to conserve bandwidth in transmission through the use of a voice codec. Additionally, certain applications operate by encrypting control signals to secure voice transmission against interception, such as with secure radio communication in which the encryption benefits insomuch that none of the original signal is sent, only envelopes of the bandpass filters, and then receiving units need only to apply the same filter configuration to re-synthesize a version of the original signal spectrum.

The term mel-spectrum or sometimes the "mel-frequency cepstrum" or "MFC" is a representation of a short-term power spectrum of a sound, based on a linear cosine transform of a log power spectrum on a nonlinear mel scale of frequency. Mel-frequency cepstral coefficients (MFCCs) are coefficients that collectively make up an MFC and are derived from a type of cepstral representation of the audio clip (e.g., a nonlinear "spectrum-of-a-spectrum"). The difference between the cepstrum and the mel-frequency cepstrum is that in the MFC, the frequency bands are equally spaced on the mel scale, which approximates the human auditory system's response more closely than the linearly-spaced frequency bands used in the normal spectrum. This frequency warping can allow for better representation of sound, for example, in audio compression. MFCCs are commonly derived by taking the Fourier transform of a signal and mapping the powers of the spectrum obtained above onto the mel scale, using triangular overlapping windows or alternatively, cosine overlapping windows. Or alternatively, by taking the logs of the powers at each of the mel frequencies. Or by taking the discrete cosine transform of the list of mel log powers, as if it were a signal. The MFCCs are the amplitudes of the resulting spectrum.

The novel methodologies described herein utilize vocoders but extend well beyond the traditional use cases which are well known to the art in support of voice synthesis, bandwidth conservation, and rudimentary encryption techniques.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various customizable and special purpose systems may be used with programs in accordance with the teachings herein, or it may prove convenient to construct a more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIG. 1 depicts a training method for the original DiffWave model contrasted with a novel training method adding a deep CNN upsampler, in accordance with described embodiments.

Introduction—There are many deterministic mathematical operations (e.g. compression, clipping, downsampling) that degrade speech quality considerably. The novel methodologies described herein set forth a neural network architecture, based on a modification of the DiffWave model, that aims to restore the original speech signal. DiffWave is a diffusion-based vocoder that has shown state-of-the-art synthesized speech quality and relatively shorter waveform generation times, with only a small set of parameters.

The novel methodologies set forth herein replace the mel-spectrum upsampler in DiffWave with a customized and specially configured deep CNN upsampler, which has been trained to alter the degraded speech mel-spectrum to match that of the original speech. According to described embodiments, the model is trained using an original speech waveform, but conditioned on the degraded speech mel-spectrum. Post-training, only the degraded mel-spectrum is used as input and the model then generates an estimate of the original speech. This new model results in improved speech quality over and above the original DiffWave model which is utilized as a baseline on several different experiments.

Such improvements include improving the quality of speech degraded by LPC-10 compression, AMRNB compression, and signal clipping. Compared to the original DiffWave architecture, the described methodologies and the new model specifically achieves better performance on several objective perceptual metrics and in subjective comparisons. Improvements over baseline are further amplified in an out-of-corpus evaluation setting.

Speech enhancement (SE) of degraded speech is important across many applications including telecommunications, speech recognition, etc. Many methods have been developed for similar applications, such as speech denoising, dereverberation and equalization. The methodologies set forth herein therefore offer novel solutions to restore the degraded speech generated by lossy deterministic transformations.

Broadly speaking, there are two families of SE techniques: those based on traditional statistical signal processing and those based on machine learning. Prior known methodologies include statistical model-based techniques, such as spectral subtraction and Wiener filtering. While these techniques will work sufficiently well for additive noise conditions, they are not suitable for implementations described herein and specifically targeted by the novel methodologies discussed in greater detail below.

Moreover, prior known enhancement methods based on machine learning models such as diffusion models and U-nets with adversarial loss have resulted in a sizeable improvement in performance. While these prior known models operate to enhance speech quality, they unfortunately require complex network structures with a large number of parameters.

Therefore, the novel methodologies as set forth herein leverage sample-efficient networks trained to invert the lossy transformation and impute the missing information in the signal. Through the practice of the disclosed techniques set forth herein, deterministic transformations (e.g. compression, clipping) and state-of-art vocoders can thus be leveraged to efficiently learn the inversion and generate high-quality speech.

Modern vocoders can generate high-quality speech based on an input conditioner (e.g. a mel-spectrum). An example of a widely used ML-based vocoder is WaveNet. It can synthesize high-quality speech, but the synthesis run-time is slow. WaveFlow is a flow-based ML vocoder with short generation time, however, it contains a large number of parameters. DiffWave, a diffusion model-based vocoder is a prior solution having state-of-the-art synthesized speech quality, a relatively short waveform generation time, and a small number of parameters. However, DiffWave was primarily used for generative modeling tasks such as unsupervised speech generation where the data distribution of audio was learned by the model.

As shown here at FIG. 1, the top portion 101 depicts supervised training 107 for the original DiffWave model, while the bottom portion 102 depicts a new model for training 107 a deep CNN upsampler w (see element 103) to match the conditioner of DiffWave's reference upsampler at element 104. The remaining DiffWave vocoder architecture 105 is then utilized for the generation of restored speech waveform 106.

A key insight of the novel methodologies as described herein is that a diffusion-based model such as DiffWave can be trained in a supervised fashion to restore degraded speech, particularly for these deterministic operations. To do so, DiffWave is conditioned on the degraded mel-spectrum of the input speech, and then the network is trained to recover waveforms corresponding back to the original speech. Notably, this method only achieves partial recovery of the original speech. To further improve performance, the DiffWave network architecture is further modified by including a pre-trained inversion network to restore the quality and intelligibility of speech. The upsampling layers in a pre-trained DiffWave model are thus replaced with a deep CNN upsampler, which has the capacity to learn an inversion model that alters the degraded speech mel-spectrum to generate the conditioner for restored speech synthesis by DiffWave model.

Experiments were conducted to compare the quality and intelligibility of restored audio when degraded by three deterministic lossy mathematical operations: linear predictive coding (LPC-10) compression, adaptive multirate narrow-band (AMR-NB) compression, and signal clipping. Results based on the original DiffWave trained in a supervised fashion as well as the modified DiffWave model with inversion module are compared. Results show that the new model successfully improves on the original DiffWave model for this application, restoring speech quality and intelligibility on both in-corpus (but out-of-sample) and cross-corpus evaluations. In summary, DiffWave is able to produce better-quality speech, even when conditioned on a distorted mel-spectrum. Furthermore, modifying DiffWave's architecture with a deep CNN upsampling network for the conditioner, thus resulting in superior quality in speech restoration.

Figure 2:
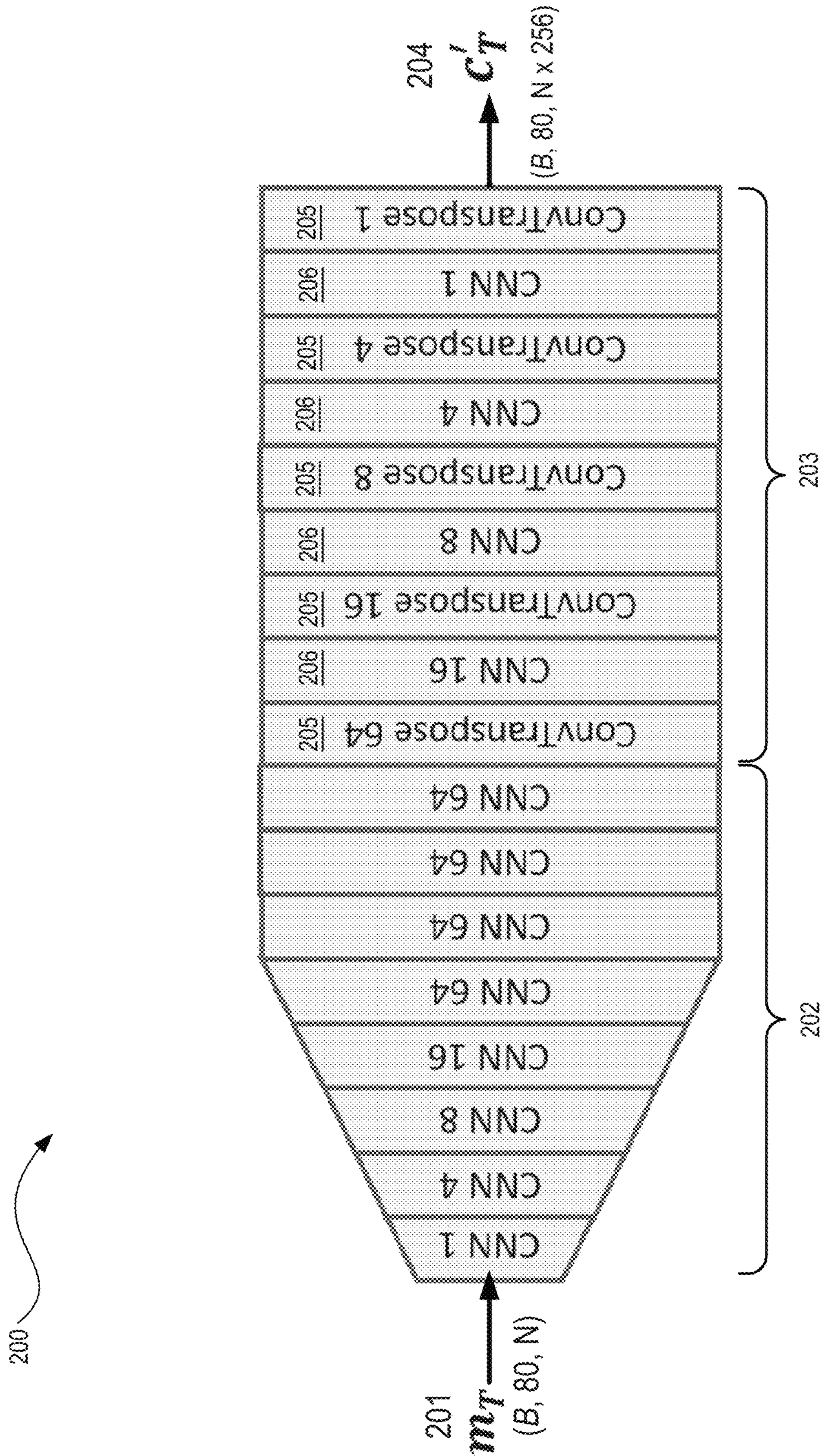
FIG. 2 depicts an illustration of network structure for a deep CNN upsampler, in accordance with described embodiments.

FIG. 2 depicts an illustration of network structure for a deep CNN upsampler 200, in accordance with described embodiments.

Architecture—Described embodiments utilize a new and specially configured upsampler network, (e.g., specifically a deep CNN upsampler 200), to replace the original and prior known variant. The degraded speech mel-spectrum $m_T$ 201 passes through several CNN nets with increasing channel size 202. The increased capacity of the upsampler 200 allows for the inversion of the non-linear transformation and then the imputation of the lost information. The output from this process is then fed through cross-stacked CNN layers and transpose layers 203 to decrease the channel size while increasing the mel-spectrum dimension 201 to match the output speech waveform's dimension.

Methodologies—Utilizing the depicted network architecture and training approach, the original DiffWave model, serving as a baseline model, is firstly trained to restore degraded speech. Secondly, modifications are made to the DiffWave vocoder using a deep CNN inversion network to further enhance performance.

DiffWave for restoring degraded speech—DiffWave is a speech waveform generative model, (e.g., a vocoder, based on diffusion models). DiffWave takes the mel-spectrum (see element 109 of FIG. 1) as conditioning input and generates corresponding speech, represented by the expression $x \rightarrow m \rightarrow c \rightarrow \hat{x}$ as shown at element 101 of FIG. 1.

While DiffWave was not originally designed for speech enhancement, described embodiments nevertheless utilize uses DiffWave for restoring 108 lossy transformed speech. For instance, the DiffWave vocoder is trained by using paired original speech x 110 and degraded speech mel-spectrum $m_T$ samples 111. According to certain embodiments, clean mel-spectrum m samples 109 may be used. Once the model converges, the trained model is then utilized to generate the estimated original speech $\hat{x}'$ 112 by conditioning on corresponding degraded speech mel-spectrum $m_T$ 111. Although a supervised DiffWave can restore the quality to a certain extent, after analyzing the structure of DiffWave, the described methodologies identified reference upsampler 104 as a key component that can be further optimized to improve quality.

Deep CNN for Conditioner Upsampling—The exemplary DiffWave model contains three modules, specifically: (i) an upsampler network 104, (ii) a diffusion embedding network, and (iii) residual learning blocks. In Diffwave, the upsampler network 104 is used to increase the dimension of the input mel-spectrum 109 to be the conditioner for speech waveform synthesis 113. The structure of the upsampler 104 in the original DiffWave model is simple, it contains two 2D convolutional transposed layers.

Prior experimental results demonstrated that simply replacing DiffWave's upsampler 104 with new upsampler network 200 did not result in improved performance. The training of a diffusion-model with the CNN upsampler 200 led to poor convergence to a local minima similar to training the original DiffWave upsampler 104.

The described embodiments overcome this problem by separately training the CNN upsampler 200, independent of DiffWave upsampler 104, but with the criterion to match DiffWave's upsampling network's output 113 on the original speech 110.

Specifically, described embodiments first train the DiffWave vocoder model which maps $x \rightarrow \hat{x}$, such that the model is trained to generate an estimated original speech waveform 114 conditioned on the original speech mel-spectrum 109. As shown at element 102 of FIG. 1, DiffWave's upsampler is then extracted as the reference upsampler 104 for the deep CNN upsampler 200 training.

The remaining DiffWave vocoder architecture 105 is used for restored speech waveform synthesis 106. To train the deep CNN upsampler 200, a reference conditioner c 115 is first generated from original speech mel-spectrum m 109 via a reference upsampler 104, and an altered conditioner $c_T'$ 116 is generated from the corresponding degraded speech mel-spectrum $m_T$ 111 with the new upsampler 103. The new upsampler 103 is trained with a mean absolute error loss (L1 loss) as defined in Equation 1:

$$\ell(c_n, c'_{T_n}; w) = \frac{1}{N}\sum_{n-1}^{N}\left|\left|c_n\right| - c'_{T_n}\right| \tag{1}$$

where $c_{T_n}'$ is given by deep CNN upsampler 200 with weights w. After training the upsampler 200, degraded speech mel-spectrum $m_T$ 201 is fed through the new deep CNN upsampler 200 to generate altered conditioner $c_T'$ 204, and then through remaining DiffWave vocoder architecture 105 to generated the estimated original speech $\hat{x}'$ 112.

FIG. 3 depicts Table 1 which provides quantitative measures of speech quality for in-corpus and cross-corpus evaluations, in accordance with described embodiments.

As shown here, quantitative measures of speech quality for in-corpus and cross-corpus evaluations. The comparisons are between the baseline model ('DW'), the modified DiffWave architecture ('ModDW'), and input degraded speech ('Degraded'). Each score is an average from a randomly-selected set of 128 samples, with standard deviation in parentheses. An asterisk means that the difference between ModDW and DW is statistically significant with $p<0.05$.

As shown here, Table 1 provides objective measures for in-corpus 176 and cross-corpus 177 evaluations of the baseline model DW 178, the proposed modified DiffWave scheme ModDW 179, and the input degraded speech Degraded 180. Comparing the score of the three operations 181, they have varying effects on speech quality. The LPC-10 compressed speech 182 results in the poorest quality speech with ModDW 179; whereas the AMR-NB compressed speech 183 has the highest score on conventional perceptual score COVL 187 at 3.0008 (0.3070) presented at element 188 but the lowest on PFP loss 183 at 0.0112 (0.0006) presented at element 189, which indicates the AMR-NB compressed speech 183 is of higher quality but is less intelligible. The worse PFP scores 183 are likely due to the fact that AMR-NB 183 downsamples the audio to 8 kHz, removing all high-frequency content beyond 4 kHz.

Comparing the PFP loss 183 for the baseline model DW 178 and degraded speech 180, the baseline 178 can restore the degraded speech 180 intelligibility under the in-corpus situation 176. However, for the conventional perceptual score (e.g., PESQ at element 184) experimental results do not show significant improvement, and in some cases the quality is poorer than the degraded speech 180 (notably, for AMR-NB 183, PESQ 184 is 2.00<2.28). In cross-corpus evaluations 177, the baseline model DW 178 failed to restore the degraded speech 180. The PFP loss 183 for the baseline model DW 178 is close or even higher than the degraded speech 180. The results indicate that the baseline models DW 178 fails to generalize outside the training set.

The modified DiffWave model ModDW 179 surpasses the baseline model DW 178 significantly both for in-corpus 176 and cross-corpus 177 evaluation for all measures. All modified DiffWave model ModDW 179 scores are higher than degraded speech 180, which means ModDW 179 can restore the quality of different degraded speech sets at evaluation time. In the experimental clipping results, the modified DiffWave model 179 achieves a PFP score 183 of 0.0098 in in-corpus evaluation 176, which nearly matches that of the original speech.

Experiment Implementation Details:

Network Architecture—The new upsampler network 200 consists of a 15-layer CNN with a largest channel size of 64, as shown in FIG. 2. The first 8 layers 202 are 2-D CNNs having a kernel size of (5,5) and stride of (1,1) across the layers; a channel size of 1, 4, 8, 16, 64, 64, 64, 64; and in which each layer is stacked with a 2-D batch normalization and a leaky-relu having a negative slope of 0.4. The next nine (9) layers depicted at element 203 provides a cross-stacked 2-D convolutional transpose net 205 and a 2-D CNN 206. For the 2-D convolutional transpose net 205, the kernel size is (3,8), the stride size is (1,4), and the channel size is kept the same as the input. For the 2-D CNN 206, the settings are the same and the channel size is 64, 16, 8, 4, 1. Again, each layer is stacked with a 2-D batch normalization and a leaky-relu whose negative slope is 0.4. These settings ensure the generated conditioner from the deep CNN upsampler 200 has the same dimensions as that generated by the reference upsampler 104. This network architecture provides a good balance on the trade-off between model performance and the size of model parameters set. Ablation studies were performed on the layer sizes and dimensions to arrive at this final architecture.

Training happens in two stages. First, the DiffWave vocoder from the original implementation is trained by training the model to generate the original speech waveform 113 conditioning on the original speech's mel-spectrum 109. The TIMIT training dataset, a widely used English speech dataset, was used for training. The DiffWave vocoder was trained for 1 M steps (100 hours on 2 Titan Xp GPUs) with a learning rate of 0.0002. For the second stage of training, the deep CNN upsampler 103 was trained to alter the upsampled conditioner from the degraded speech mel-spectrum 116 to match 117 that generated by the reference upsampler from the paired original speech mel-spectrum 115. Upsampler 103 is trained for approximately 50 k steps (6 hours on 1 Titan Xp GPU) with a learning rate of 0.001 using the Adam optimizer.

Lossy Operations—Three distinct experiments were conducted to evaluate ModDW (at element 179), specifically: (1) An experiment for restoring speech compressed by the LPC-10 algorithm 182, (2) An experiment for restoring speech compressed by the AMR-NB algorithm 183 (mode: MR515, bit rate=5.15 kbit/s), and (3) An experiment for restoring speech with clipped magnitude 184 (in which 25% of the highest-energy samples clipped).

Datasets—For all three experiments described above, the TIMIT training and testing dataset was used as the training and in-corpus evaluation dataset correspondingly. The speech in TIMIT was regarded as original speech 117 for the sake of the experiments. The three algorithms 182-184 were used to generate degraded speech files 118. A cross-corpus evaluation 177 was also conducted for each of the three conditions 182-184 using the Mozilla common voice English dataset. The Mozilla common voice English dataset provides a large corpus that contains more than 1,500 hours of short sentences read by English speakers with various accents, ages, and genders across the world. A total of 128 speech samples were randomly selected and down-sampled to 16 kHz. Next, the three algorithms 182-184 were used to generate degraded speech 180 for cross-corpus evaluation 177. The cross-corpus evaluation 177 did not involve additional training or fine-tuning for these experiments. Note that all experiments 182-184 were based on 16 kHz speech.

Evaluation metrics—To evaluate the restored speech quality quantitatively, metrics used widely in speech enhancement were chosen, namely PESQ 184, CSIG 185, CBAK 186 and COVL 187, and the phone-fortified perceptual (PFP) loss 183. These metrics were not applied during training. PESQ 184, CSIG 185, CBAK 186, and COVL 187 have been shown to correlate with "quality", whereas the PFP loss 183 is a proxy for "intelligibility" as it is based on a speech recognition model. For all metrics, the required reference signal is the original speech 117.

Baseline model—The baseline model utilized for the experiments was the original DiffWave model trained for restoring degraded speech as mentioned above. For all three experiments, the DiffWave model was trained with the original speech waveform 117 and corresponding degraded speech mel-spectrum 111.

Figure 4:
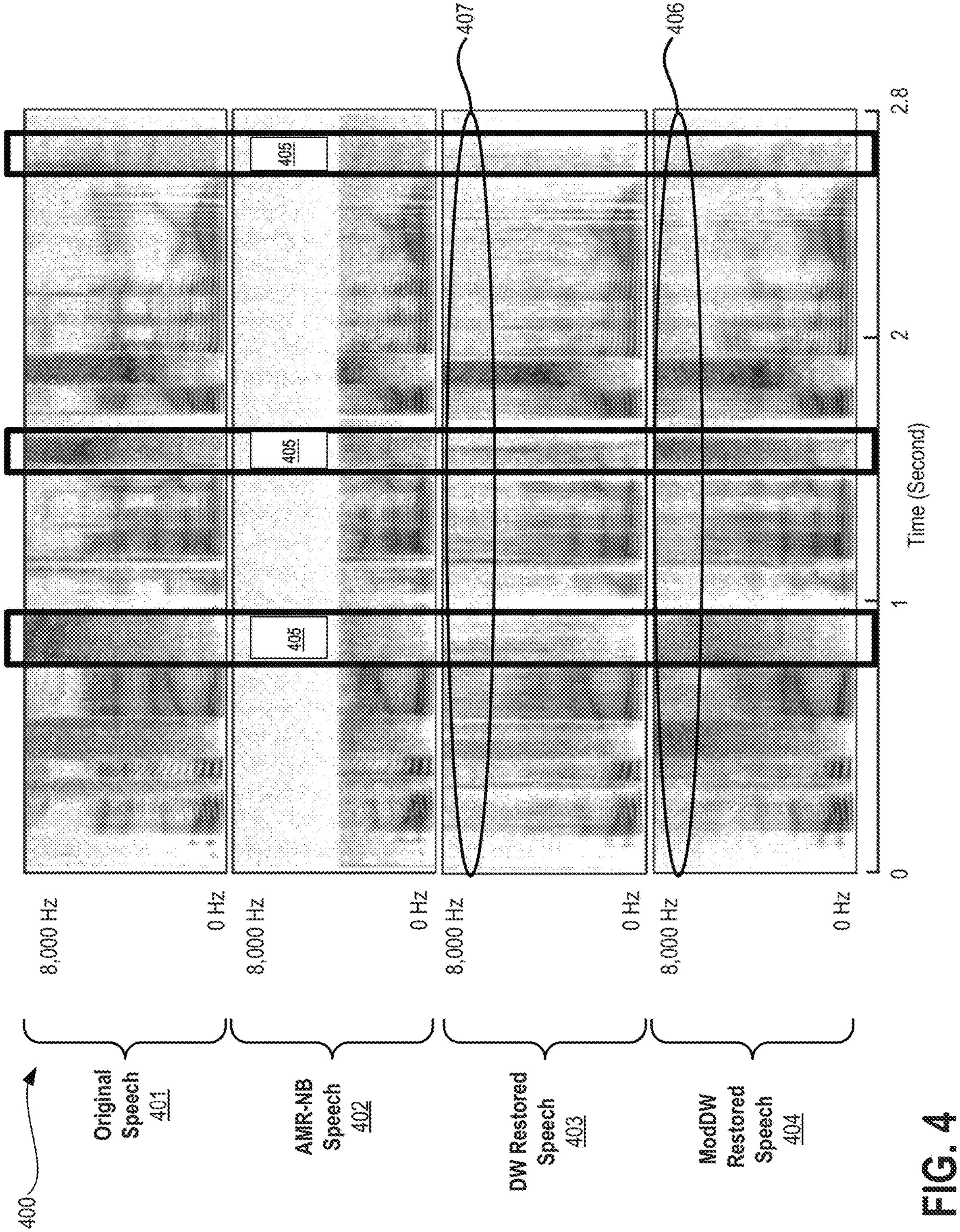
FIG. 4 depicts a comparison of spectra between original speech, degraded speech, baseline model, and modified DiffWave model, in accordance with described embodiments.

FIG. 4 depicts a comparison of spectra 400 between original speech, degraded speech, baseline model, and modified DiffWave model, in accordance with described embodiments.

As shown here, there is a comparison of spectra 400 between the original speech 401, degraded speech 402, baseline model 403, and modified DiffWave model 404. Samples are from the AMR-NB experiment for the in-corpus evaluation dataset on a TIMIT sample. The differences in high-frequency restoration are apparent in the highlighted regions 405.

Objective evaluations—The modified model 404 more accurately imputes missing information in the high frequency 8000 Hz band 406 relative to the baseline model at high frequency 8000 Hz band 407. It is important to note that the cross-corpus evaluation is especially difficult. This corpus contains sentences recorded by English speakers with various ages, genders, and accents/dialects. This provides strong evidence of generalizability.

Subjective evaluations—Moreover, it should be noted that the perceptual measures used are imperfect proxies for human perception, as the restored speech's perceptual measures can be worse but listeners could still think the speech sounds better. Listening to speech samples will allow for better assessment regarding the quality of reconstructed speech.

Figure 5:
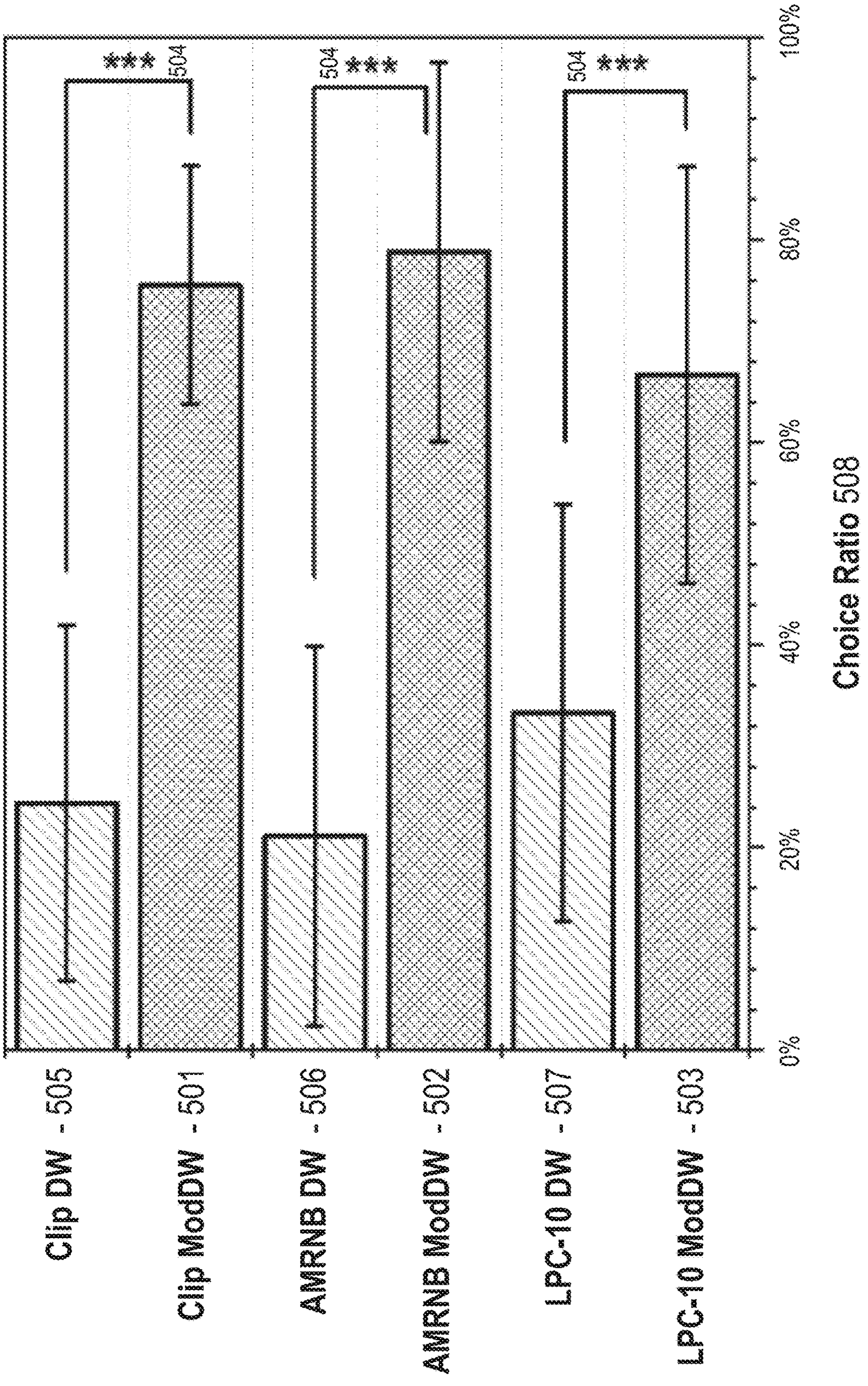
FIG. 5 depicts results of AB preference tests comparing the modified DiffWave model performance on restoring degraded speech with a baseline model, in accordance with described embodiments.

FIG. 5 depicts results of AB preference tests comparing the modified DiffWave model performance on restoring degraded speech with a baseline model, in accordance with described embodiments.

To compare methods subjectively, AB preference tests were conducted to compare the baseline model with modified DiffWave model performance on restoring degraded speech. For each listening test, fifteen (15) pairs of original and restored speech samples were generated randomly from the TIMIT evaluation dataset, five (5) pairs from the LPC-10 experiment, five (5) pairs from the AMR-NB experiment, and five (5) pairs from the signal clipping experiment. Notably, the same spoken sentence was not used twice in any of the pairs. A total of eighteen (18) human listeners participated in the study and were instructed to select the sample with better quality without knowledge of what method generated the sample, as represented by choice ratio (element 508).

The AB preference results shown here at FIG. 5 depict that the modified DiffWave model 501-503 significantly outperforms (with p-value<0.001 as presented at element 504) the baseline model 505-507 in all three experiments.

Conclusions—Consequently, the disclosed methodologies provide a specially configured and custom modified DiffWave model for superior quality restoration from distorted and lossy speech, in which the DiffWave vocoder model is first trained to restore degraded speech in supervised fashion and produce good results. There is in addition a modified model that uses a deep CNN upsampler to replace original upsampler in DiffWave. Extensive in-corpus, cross-corpus and subjective perceptual evaluations show that the modified DiffWave model outperforms the original model in restoring degraded speech generated by lossy transformations.

The modified DiffWave model can revert the deterministic transformation. Future work will focus on extending this scheme to scenarios where the transformation is stochastic (e.g. noisy speech).

Figure 6:
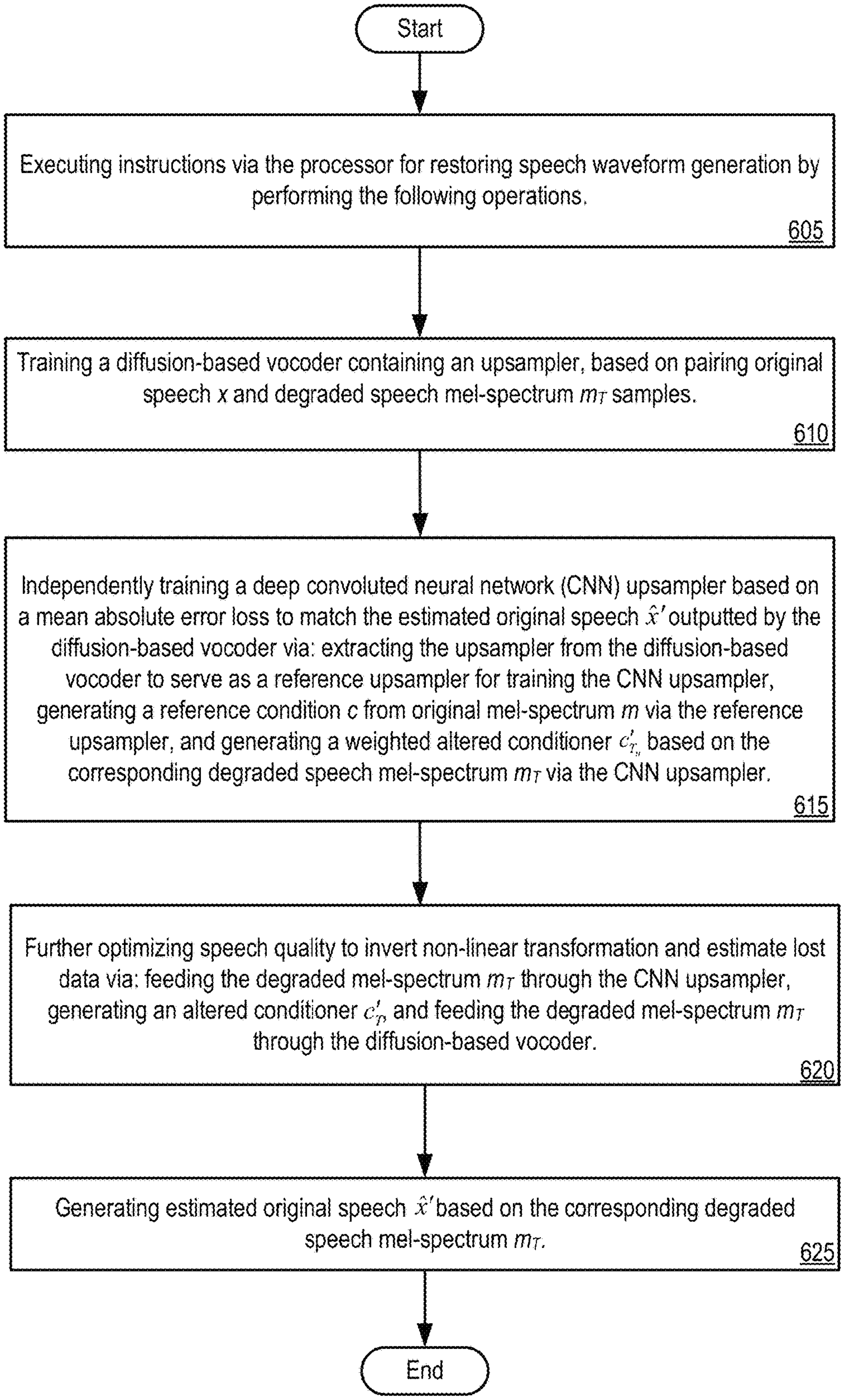
FIG. 6 depicts a flow diagram illustrating a method for restoring speech waveform generation by training a diffusion-based vocoder containing an upsampler, based on pairing original speech and degraded speech mel-spectrum samples, in accordance with described embodiments.

FIG. 6 depicts a flow diagram illustrating a method for restoring speech waveform generation by training a diffusion-based vocoder containing an upsampler, based on pairing original speech x and degraded speech mel-spectrum samples, in accordance with described embodiments.

Method 600 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur.

With reference to the method 600 depicted at FIG. 6, there is a method performed by a system specially configured to restore waveform generation. Such a system may be configured with at least a processor and a memory to execute specialized instructions which cause the system to perform the following operations: training a diffusion-based vocoder containing an upsampler, based on pairing original speech x and degraded speech mel-spectrum $m_T$ samples; independently training a deep convoluted neural network (CNN) upsampler based on a mean absolute error loss to match the estimated original speech $\hat{x}'$ outputted by the diffusion-based vocoder via the operations of: extracting the upsampler from the diffusion-based vocoder to serve as a reference upsampler for training the CNN upsampler and then generating a reference conditioner c from original speech mel-spectrum m via the reference upsampler. Further operations are performed by the system for generating a weighted altered conditioner $c_{T_n}'$ based on the corresponding degraded speech mel-spectrum $m_T$ via the CNN upsampler and then optimizing speech quality to invert non-linear transformation and estimate lost data via the operations of: feeding the degraded mel-spectrum $m_T$ through the CNN upsampler, generating an altered conditioner $c_T'$ and feeding the degraded mel-spectrum $m_T$ through the diffusion-based vocoder; and generating estimated original speech $\hat{x}'$ based on the corresponding degraded speech mel-spectrum $m_T$.

Processing for method 600 begins at block 605 by executing instructions via the processor of the exemplary system for restoring speech waveform generation, by performing the following operations:

At block 610, processing logic of the system trains a diffusion-based vocoder containing an upsampler, based on pairing original speech x and degraded speech mel-spectrum $m_T$ samples.

At block 615, processing logic of the system independently trains a deep convoluted neural network (CNN) upsampler based on a mean absolute error loss to match the estimated original speech $\hat{x}'$ outputted by the diffusion-based vocoder via: extracting the upsampler from the diffusion-based vocoder to serve as a reference upsampler for training the CNN upsampler, generating a reference conditioner c from original speech mel-spectrum m via the reference upsampler, and then generates a weighted altered conditioner $c_{T_n}'$ based on the corresponding degraded speech mel-spectrum $m_T$ via the CNN upsampler.

At block 620, processing logic of the system further optimizes speech quality to invert non-linear transformation and estimate lost data via the operations of: feeding the degraded mel-spectrum $m_T$ through the CNN upsampler, generating an altered conditioner $c_T'$, and feeding the degraded mel-spectrum $m_T$ through the diffusion-based vocoder.

At block 625, the system generates estimated original speech $\hat{x}'$ based on the corresponding degraded speech mel-spectrum $m_T$.

According to another embodiment of method 600, the CNN upsampler is further trained based on mean absolute error loss $$\ell(c_n, c'_{T_n}; w) = \frac{1}{N}\sum_{n=1}^{N}\left|\|c_n\| - c'_{T_n}\right|,$$

wherein $c_{T_n}'$ is given by the CNN upsampler with weights w.

According to another embodiment of method 600, the method inverts lossy transformation and imputes lost information via a CNN upsampler architecture having: nets with increasing channel size, and cross-stacked CNN-transpose layers, wherein the cross-stacked CNN-transpose layers decrease channel size while increasing mel-spectrum dimension, wherein the mel-spectrum dimension matches output speech waveform dimensions.

According to another embodiment of method 600, feeding the degraded mel-spectrum through the CNN upsampler includes feeding the degraded mel-spectrum through CNN upsampler architecture not used in independently training the CNN upsampler.

According to another embodiment of method 600, the system most accurately imputes missing information in a high frequency band when compared to high frequency band performance using the diffusion-based vocoder containing an upsampler alone.

According to another embodiment of method 600, each layer of the CNN upsampler is stacked with a 2-D batch normalization and a leaky-relu having a negative slope of 0.4.

According to another embodiment of method 600, the speech waveform generation to restore is stochastic speech having background noise.

According to a particular embodiment, there is a non-transitory computer readable storage medium having instructions stored thereupon that, when executed by a system having at least a processor and a memory therein, the instructions cause the system to perform operations for restoring waveform generation. According to such an embodiment, executing the instructions causes the system to perform at least the following operations: training a diffusion-based vocoder containing an upsampler, based on pairing original speech x and degraded speech mel-spectrum $m_T$ samples; independently training a deep convoluted neural network (CNN) upsampler based on a mean absolute error loss to match the estimated original speech $\hat{x}'$ outputted by the diffusion-based vocoder via: extracting the upsampler from the diffusion-based vocoder to serve as a reference upsampler for training the CNN upsampler, generating a reference conditioner c from original speech mel-spectrum m via the reference upsampler, and generating a weighted altered conditioner $c_{T_n}'$ based on the corresponding degraded speech mel-spectrum $m_T$ via the CNN upsampler; further optimizing speech quality to invert non-linear transformation and estimate lost data via: feeding the degraded mel-spectrum $m_T$ through the CNN upsampler, generating an altered conditioner $c_T'$, and feeding the degraded mel-spectrum $m_T$ through the diffusion-based vocoder; and generating estimated original speech $\hat{x}'$ based on the corresponding degraded speech mel-spectrum $m_T$.

Figure 7:
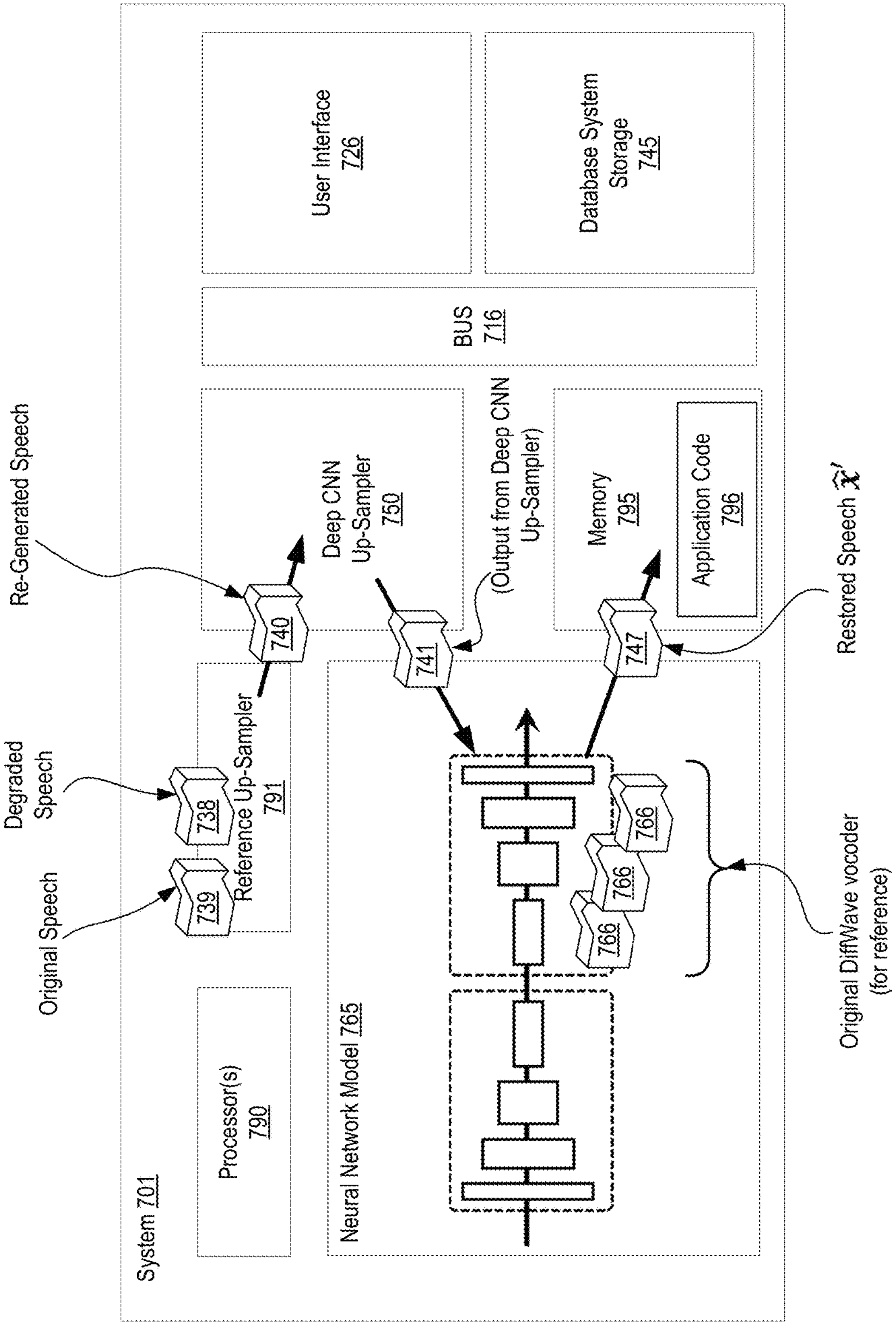
FIG. 7 shows a diagrammatic representation of a system within which embodiments may operate, be installed, integrated, or configured, in accordance with one embodiment.

FIG. 7 shows a diagrammatic representation of a system 701 within which embodiments may operate, be installed, integrated, or configured. In accordance with one embodiment, there is a system 701 having at least a processor 790 and a memory 795 therein to execute implementing application code 796. Such a system 701 may communicatively interface with and cooperatively execute with the benefit of remote systems, such as a user device sending instructions and data, a user device to receive as an output from the system 701.

According to the depicted embodiment, the system 701, includes the processor 790 and the memory 795 to execute instructions at the system 701. The system 701 as depicted here is specifically customized and configured specifically to restore degraded speech via a modified diffusion model, in accordance with disclosed embodiments.

According to a particular embodiment, system 701 is specifically configured to execute instructions via the processor for restoring restore speech waveform generation by performing the operations including: training a diffusion-based vocoder containing an upsampler 791, based on pairing original speech x (element 739) and degraded speech mel-spectrum $m_T$ samples (element 738). The system independently trains a deep convoluted neural network (CNN) upsampler 750 based on a mean absolute error loss to match the estimated original speech $\hat{x}'$ outputted 740 by the diffusion-based vocoder, by extracting the upsampler from the diffusion-based vocoder to serve as a reference upsampler for training the CNN upsampler, generating a reference conditioner c from original speech mel-spectrum m via the reference upsampler, and generating a weighted altered conditioner $c_{T_n}'$ based on the corresponding degraded speech mel-spectrum $m_T$ via the CNN upsampler. The system further optimizes speech quality to invert non-linear transformation and estimate lost data by feeding the degraded mel-spectrum $m_T$ through the deep CNN upsampler 750, to generate and output an altered conditioner $c_T'$ (see element 741) and then feeding the degraded mel-spectrum $m_T$ through the diffusion-based vocoder (see element 766); and generating estimated original speech $\hat{x}'$ (see element 747) based on the corresponding degraded speech mel-spectrum $m_T$.

According to another embodiment of the system 701, a user interface 726 communicably interfaces with a user client device remote from the system and communicatively interfaces with the system via a public Internet.

Bus 716 interfaces the various components of the system 701 amongst each other, with any other peripheral(s) of the system 701, and with external components such as external network elements, other machines, client devices, cloud computing services, etc. Communications may further include communicating with external devices via a network interface over a LAN, WAN, or the public Internet.

Figure 8:
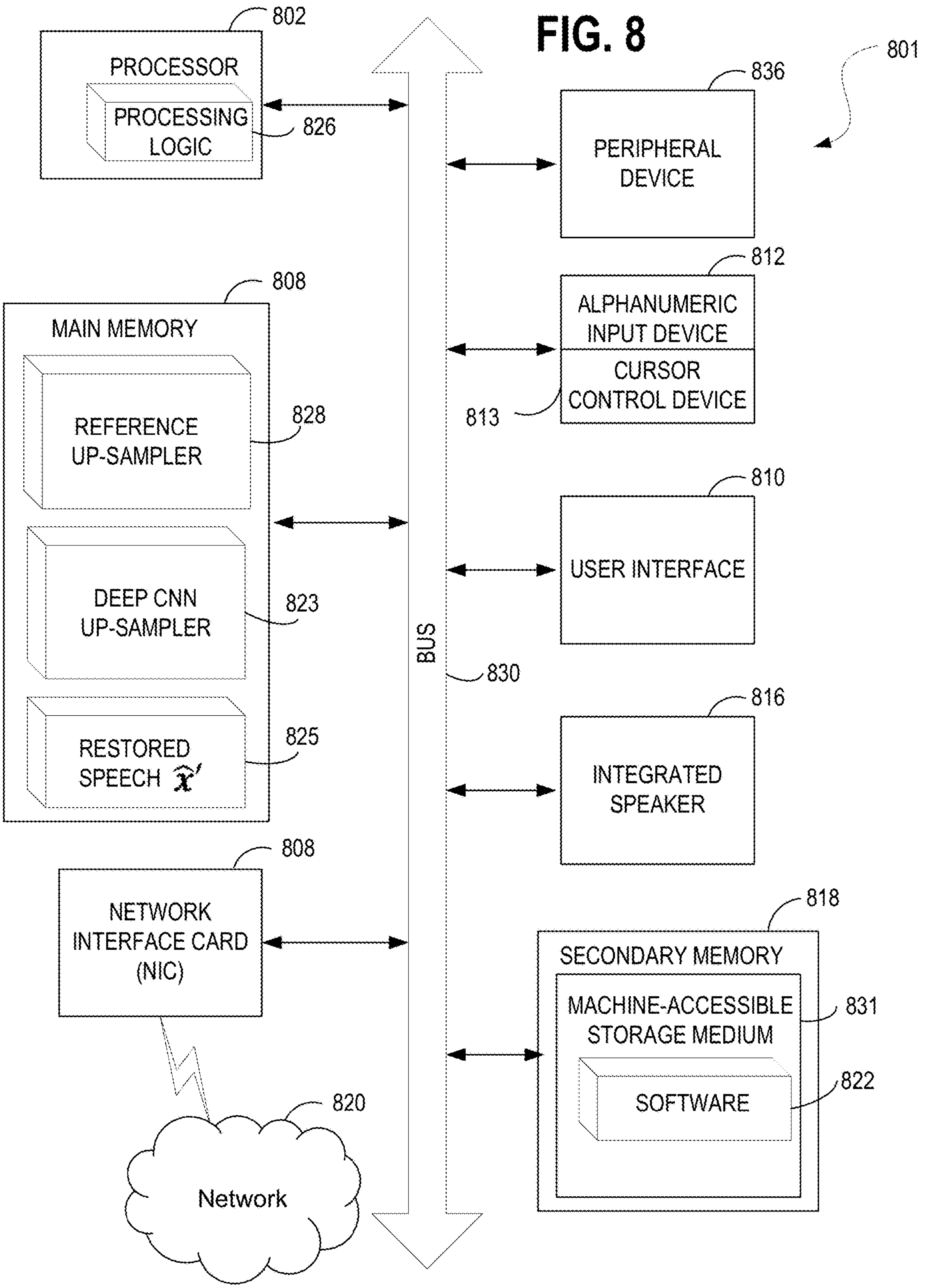
FIG. 8 illustrates a diagrammatic representation of a machine in the exemplary form of a computer system, in accordance with one embodiment.

FIG. 8 illustrates a diagrammatic representation of a machine 801 in the exemplary form of a computer system, in accordance with one embodiment, within which a set of instructions, for causing the machine/computer system 801 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 801 includes a processor 802, a main memory 808 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 808 includes a reference up-sampler 828 which provides sampling input(s) to the deep Convolutional Neural Network (CNN) up-sampler 823. After processing, the machine yields restored speech $\hat{x}'$ 825, in support of the methodologies and techniques described herein. Main memory 808 and its sub-elements are further operable in conjunction with processing logic 826 and processor 802 to perform the methodologies discussed herein.

Processor 802 represents one or more specialized and specifically configured processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application-specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 801 may further include a network interface card 808. The computer system 801 also may include a user interface 810 (such as a video display unit, a liquid crystal display, etc.), an alphanumeric input device 812 (e.g., a keyboard), a cursor control device 813 (e.g., a mouse), and a signal generation device 816 (e.g., an integrated speaker). The computer system 801 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 808 and/or within the processor 802 during execution thereof by the computer system 801, the main memory 808 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:

a memory to store instructions;

a processor to execute the instructions stored in the memory;

wherein the system is specially configured to restore speech waveform generation by performing the following operations:

training a diffusion-based vocoder containing an upsampler, based on pairing original speech x and degraded speech mel-spectrum $m_T$ samples;

independently training a deep convoluted neural network (CNN) upsampler based on a mean absolute error loss to match the estimated original speech $\hat{x}'$ outputted by the diffusion-based vocoder via:

extracting the upsampler from the diffusion-based vocoder to serve as a reference upsampler for training the CNN upsampler, generating a reference conditioner c from original speech mel-spectrum m via the reference upsampler, and generating a weighted altered conditioner $c_{T_n}'$ based on the corresponding degraded speech mel-spectrum $m_T$ via the CNN upsampler;

further optimizing speech quality to invert non-linear transformation and estimate lost data via:

feeding the degraded mel-spectrum $m_T$ through the CNN upsampler, generating an altered conditioner $c_T'$, and feeding the degraded mel-spectrum $m_T$ through the diffusion-based vocoder; and generating estimated original speech $\hat{x}'$ based on the corresponding degraded speech mel-spectrum $m_T$.

2. The system of claim 1, wherein the CNN upsampler is further trained based on mean absolute error loss $$\ell(c_n, c'_{T_n}; w) = \frac{1}{N}\sum_{n-1}^{N}\left|\,|c_n| - c'_{T_n}\right|,$$

wherein $c_{T_n}'$ is given by the CNN upsampler with weights w.

3. The system of claim 1, wherein the system inverts lossy transformation and imputes lost information via a CNN upsampler architecture having:

nets with increasing channel size, and cross-stacked CNN-transpose layers, wherein the cross-stacked CNN-transpose layers decrease channel size while increasing mel-spectrum dimension, wherein the mel-spectrum dimension matches output speech waveform dimensions.

4. The system of claim 3, wherein each layer is stacked with a 2-D batch normalization and a leaky-relu having a negative slope of 0.4.

5. The system of claim 1, wherein feeding the degraded mel-spectrum $m_T$ through the CNN upsampler includes feeding the degraded mel-spectrum $m_T$ through CNN upsampler architecture not used in independently training the CNN upsampler.

6. The system of claim 1, wherein the system most accurately imputes missing information in a high frequency band when compared to high frequency band performance using the diffusion-based vocoder containing an upsampler alone.

7. The system of claim 1, wherein the speech waveform generation to restore is stochastic speech having background noise.

8. Non-transitory computer-readable storage media having instructions stored thereupon that, when executed by a system having at least a processor and a memory therein, the instructions cause the system to restore speech waveform generation, by performing operations including:

training a diffusion-based vocoder containing an upsampler, based on pairing original speech x and degraded speech mel-spectrum $m_T$ samples;

independently training a deep convoluted neural network (CNN) upsampler based on a mean absolute error loss to match the estimated original speech $\hat{x}'$ outputted by the diffusion-based vocoder via:

extracting the upsampler from the diffusion-based vocoder to serve as a reference upsampler for training the CNN upsampler, generating a reference conditioner c from original speech mel-spectrum m via the reference upsampler, and generating a weighted altered conditioner $c_{T_n}'$ based on the corresponding degraded speech mel-spectrum $m_T$ via the CNN upsampler;

further optimizing speech quality to invert non-linear transformation and estimate lost data via:

feeding the degraded mel-spectrum $m_T$ through the CNN upsampler, generating an altered conditioner $c_T'$, and feeding the degraded mel-spectrum $m_T$ through the diffusion-based vocoder; and generating estimated original speech $\hat{x}'$ based on the corresponding degraded speech mel-spectrum $m_T$.

9. The non-transitory computer-readable storage media of claim 8, wherein the CNN upsampler is further trained based on mean absolute error loss $$\ell(c_n, c'_{T_n}; w) = \frac{1}{N}\sum_{n-1}^{N} \|c_n| - c'_{T_n}|,$$

wherein $c_{T_n}'$ is given by the CNN upsampler with weights w.

10. The non-transitory computer-readable storage media of claim 8, wherein the system inverts lossy transformation and imputes lost information via a CNN upsampler architecture having:

nets with increasing channel size, and cross-stacked CNN-transpose layers, wherein the cross-stacked CNN-transpose layers decrease channel size while increasing mel-spectrum dimension, wherein the mel-spectrum dimension matches output speech waveform dimensions.

11. The non-transitory computer-readable storage media of claim 10, wherein each layer is stacked with a 2-D batch normalization and a leaky-relu having a negative slope of 0.4.

12. The non-transitory computer-readable storage media of claim 8, wherein feeding the degraded mel-spectrum $m_T$ through the CNN upsampler includes feeding the degraded mel-spectrum $m_T$ through CNN upsampler architecture not used in independently training the CNN upsampler.

13. The non-transitory computer-readable storage media of claim 8, wherein the system most accurately imputes missing information in a high frequency band when compared to high frequency band performance using the diffusion-based vocoder containing an upsampler alone.

14. The non-transitory computer-readable storage media of claim 8, wherein the speech waveform generation to restore is stochastic speech having background noise.

15. A method performed by a system having at least a processor and a memory therein to execute instructions for defending against adversarial attacks on neural networks, wherein the method comprises:

executing instructions via the processor for restoring speech waveform generation;

training a diffusion-based vocoder containing an upsampler, based on pairing original speech x and degraded speech mel-spectrum $m_T$ samples;

independently training a deep convoluted neural network (CNN) upsampler based on a mean absolute error loss to match the estimated original speech $\hat{x}'$ outputted by the diffusion-based vocoder via:

extracting the upsampler from the diffusion-based vocoder to serve as a reference upsampler for training the CNN upsampler, generating a reference conditioner c from original speech mel-spectrum m via the reference upsampler, and generating a weighted altered conditioner $c_{T_n}'$ based on the corresponding degraded speech mel-spectrum $m_T$ via the CNN upsampler;

further optimizing speech quality to invert non-linear transformation and estimate lost data via:

feeding the degraded mel-spectrum $m_T$ through the CNN upsampler, generating an altered conditioner $c_T'$, and feeding the degraded mel-spectrum $m_T$ through the diffusion-based vocoder; and generating estimated original speech $\hat{x}'$ based on the corresponding degraded speech mel-spectrum $m_T$.

16. The method of claim 15, wherein the CNN upsampler is further trained based on mean absolute error loss $$\ell(c_n, c'_{T_n}; w) = \frac{1}{N}\sum_{n-1}^{N} \|c_n| - c'_{T_n}|,$$

wherein $c_{T_n}'$ is given by the CNN upsampler with weights w.

17. The method of claim 15, wherein the system inverts lossy transformation and imputes lost information via a CNN upsampler architecture having:

nets with increasing channel size, and cross-stacked CNN-transpose layers, wherein the cross-stacked CNN-transpose layers decrease channel size while increasing mel-spectrum dimension, wherein the mel-spectrum dimension matches output speech waveform dimensions.

18. The method of claim 15, wherein feeding the degraded mel-spectrum $m_T$ through the CNN upsampler includes feeding the degraded mel-spectrum $m_T$ through CNN upsampler architecture not used in independently training the CNN upsampler.

19. The method of claim 15, wherein the system most accurately imputes missing information in a high frequency band when compared to high frequency band performance using the diffusion-based vocoder containing an upsampler alone.

20. The method of claim 15, wherein the speech waveform generation to restore is stochastic speech having background noise.

* * * * *